United States Patent
Yoon

(10) Patent No.: US 7,657,166 B2
(45) Date of Patent: Feb. 2, 2010

(54) MOBILE COMMUNICATION TERMINAL HAVING CAMERA FUNCTION AND METHOD FOR PERFORMING THE SAME

(75) Inventor: Woo-Sun Yoon, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 11/203,221

(22) Filed: Aug. 15, 2005

(65) Prior Publication Data

US 2006/0210257 A1 Sep. 21, 2006

(30) Foreign Application Priority Data

Mar. 21, 2005 (KR) .................. 10-2005-0023147

(51) Int. Cl.
G03B 17/00 (2006.01)
H04N 5/262 (2006.01)
H04N 5/222 (2006.01)
H04M 1/00 (2006.01)

(52) U.S. Cl. .............. 396/77; 396/78; 348/240.99; 348/333.02; 455/566

(58) Field of Classification Search .......... 396/65, 396/78, 80, 82, 89, 277, 77; 348/333.02, 348/333.01, 240.99; 455/566
See application file for complete search history.

(56) References Cited

U.S. PATENT DOCUMENTS

| 6,144,403 A * | 11/2000 | Otani | 348/14.12 |
| 6,370,336 B1 * | 4/2002 | Nishinou et al. | 396/277 |
| 6,463,220 B1 * | 10/2002 | Dance et al. | 396/431 |
| 6,741,280 B1 * | 5/2004 | Shioji | 348/240.99 |
| 6,943,839 B1 * | 9/2005 | Matsumoto et al. | 348/333.01 |
| 7,151,932 B2 * | 12/2006 | Major | 455/435.3 |
| 7,154,544 B2 * | 12/2006 | Kowno et al. | 348/240.99 |
| 7,330,607 B2 * | 2/2008 | Jung et al. | 382/298 |
| 2001/0026683 A1 * | 10/2001 | Morimoto et al. | 396/89 |
| 2003/0052985 A1 * | 3/2003 | Oya et al. | 348/333.02 |

FOREIGN PATENT DOCUMENTS

EP   1 205 790   5/2002

* cited by examiner

Primary Examiner—Melissa J Koval
(74) Attorney, Agent, or Firm—Roylance, Abrams, Berdo & Goodman, L.L.P.

(57) ABSTRACT

A method is provided for performing a camera function including a zoom function by which an image of a subject is photographed in zoom steps so that the image is magnified or reduced. The method comprises the steps of detecting a distance between the subject and a camera, if a shutter key for photographing an image of the subject in a mode for photographing the subject in full size of a screen of a display section is input, regulating the magnification of the zoom in a zoom step stored in advance, corresponding to the detected distance, and photographing the image of the subject in a regulated magnification of the zoom. The optimum zoom step is automatically regulated according to the distance between the subject and the camera, and the image of the subject can be photographed in the full size of the screen of the display section without regulating the zoom directly.

17 Claims, 8 Drawing Sheets

200
(A4 DOCUMENT)

<RECENT ECONOMIC TENDENCY>
AS THE PROPENSITY TO CONSUME IS
REVIVING THIS YEAR_____

IS EXPECTED TO BE RESTORED
[WRITTEN BY HONG KILDONG]

FIG.5A

MOBILE COMMUNICATION TERMINAL HAVING CAMERA FUNCTION AND METHOD FOR PERFORMING THE SAME

PRIORITY

This application claims the benefit under 35 U.S.C. §119(a) of Korean Patent Application entitled "MOBILE COMMUNICATION TERMINAL HAVING A CAMERA FUNCTION AND METHOD FOR PERFORMING THE SAME" filed in the Korean Industrial Property Office on Mar. 21, 2005 and assigned Serial No. 2005-23147, the entire contents of which are hereby incorporated by reference.

BACKGROUND OF THE INVENTION

1. Field of the Invention

The present invention relates to a mobile communication terminal having a camera function. More particularly, the present invention relates to a mobile communication terminal and a method which can photograph an image of a subject in full size of a screen of a display section, in other words, in an optimum size regardless of a distance between the subject and the camera.

2. Description of the Related Art

Generally, a mobile communication terminal is a portable device for communication functions by which a user can communicate or exchange data. The mobile communication terminal comprises a cellular phone, a Personal Digital Assistant (PDA), a Personal Communication Service (PCS) phone, an International Mobile Telecommunication-2000 (IMT-2000) terminal, or a Global System for Mobile Communication (GSM) terminal.

The mobile communication terminal is a device popularly used by anyone and all over the world, and is recognized as a portable requisite. Therefore, the mobile communication terminal has a trend towards miniaturization, slimness, and light weight, considering the portability, and pursues a multimedia environment in which more functions can be performed. Especially, a future mobile communication terminal will be used for miniaturization, multi-function, and multi-purpose and will be modified so as to be suitable for various multimedia environment and the internet environment.

Currently, the mobile communication terminal has a structure by which high speed data can be transmitted as well as a voice communication function. If the mobile communication network of IMT-2000 standard is embodied, the high speed data communication can be also embodied in addition to the voice communication by using the mobile communication terminal. The data which can be processed in the mobile communication terminal for performing the data communication can be packet data and image data. Further, a function by which moving picture signals can be displayed has been embodied in the mobile communication terminal, in addition to a camera function and a TV receiver function. Therefore, the mobile communication terminal comprising a camera can photograph an image of a subject and display it in a moving picture or a still picture, and can transmit the photographed image screen. Further, the mobile communication terminal comprising a camera has a zoom function, and provides a function by which the photographed image can be magnified and reduced.

The mobile communication terminal comprising a zoom function, such as optical three times zoom or five times zoom, generally has preferably six to seven steps from a preview state, WIDE to TELE.

On the other hand, a user occasionally photographs a document of A4 size, a printed photograph, a picture and the like by using the mobile communication terminal comprising the above-mentioned zoom function. In that case, the mobile communication terminal has an inconvenience in that the user regulates the zoom directly, watching a subject, such as a document or a photograph, through the preview screen or regulates a distance between the camera and the subject properly, to photograph the subject in full size of the screen of a display section of the mobile communication terminal.

SUMMARY OF THE INVENTION

Accordingly, the present invention has been made to solve the above-mentioned problems occurring in the prior art, and an object of the present invention is to provide a mobile communication terminal and a method which can photograph an image of a subject in full size of a screen of a display section, in other words, in an optimum size regardless of a distance between the subject and the camera.

Another object of the present invention is to provide a mobile communication terminal and a method which can photograph an image of a subject in full size of a screen of a display section without regulating the zoom directly, thereby improving the convenience of a user.

In order to accomplish exemplary object, a method according to an exemplary embodiment of the present invention is provided for performing a camera function comprising a zoom function by which the image of a subject is photographed in zoom steps so that the image is magnified or reduced. The method comprises the steps of detecting the distance between the subject and camera if a shutter key for photographing an image of the subject in a mode for photographing the subject in full size of a screen of a display section is input, regulating the magnification of the zoom in a zoom step stored in advance, corresponding to the detected distance, and photographing the image of the subject in a regulated magnification of the zoom.

According to an exemplary embodiment of the present invention, the method for performing a camera function further comprises the step of storing in advance the information to which the zoom steps for photographing the image of the subject in full size of a screen of a display section according to the distance between the subject and the camera correspond.

Further, according to an exemplary embodiment of the present invention, a method for performing a camera function comprising a zoom function by which an image of a subject is photographed in zoom steps so that the image is magnified or reduced, comprises the steps of detecting a distance between the subject and a camera if a shutter key for photographing an image of the subject in a document photographing mode for photographing a document of a predetermined size in full size of a screen of a display section is input, regulating the magnification of the zoom in a zoom step stored in advance, corresponding to the detected distance, and photographing the document in a regulated magnification of the zoom.

According to an exemplary embodiment of the present invention, the method for performing a camera function further comprises the step of storing in advance the information to which the zoom steps for photographing the document in full size of a screen of a display section according to the distance between the subject and the camera correspond.

Further, according to an exemplary embodiment of the present invention, a mobile communication terminal having a zoom function which photographs a subject, magnifies and reduces the subject, comprises a camera section having a lens section capable of being withdrawn out or put in, for photographing an image of the subject through the lens section, a display section for displaying the photographed image of the subject, a memory for storing the information to which a zoom step for photographing an image of a subject in full size of the screen of the display section according to a distance between the subject to be photographed and the camera corresponds, and a control section for detecting the distance between the subject and the camera if a shutter key for photographing an image is input in a mode for photographing the subject in full size of a screen of the display section and controlling the mobile communication terminal to photograph the image of the subject in a zoom step read from the memory and corresponding to the detected distance.

BRIEF DESCRIPTION OF THE DRAWINGS

The above and other exemplary objects, features and advantages of the present invention will be more apparent from the following detailed description of the exemplary embodiments taken in conjunction with the accompanying drawings, in which:

FIGS. 5a through 5d are exemplary views illustrating operations of the mobile communication terminal according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

Hereinafter, exemplary embodiments of the present invention will be described with reference to the accompanying drawings. A detailed description of known functions and configurations incorporated herein will be omitted for clarity and conciseness.

Figure 1:
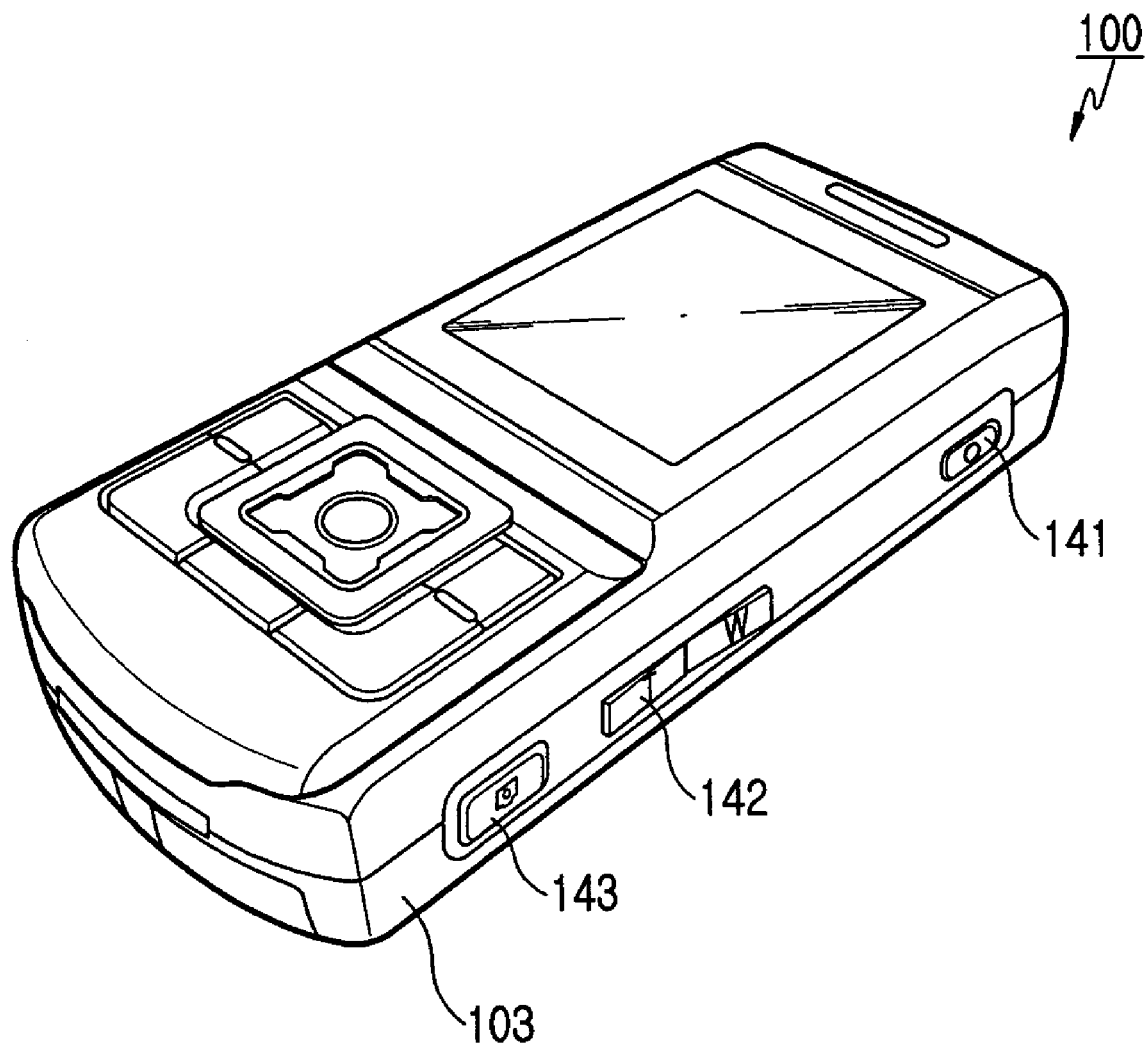
FIG. 1 is a perspective view illustrating a mobile communication terminal according to an exemplary embodiment of the present invention.
Figure 2:
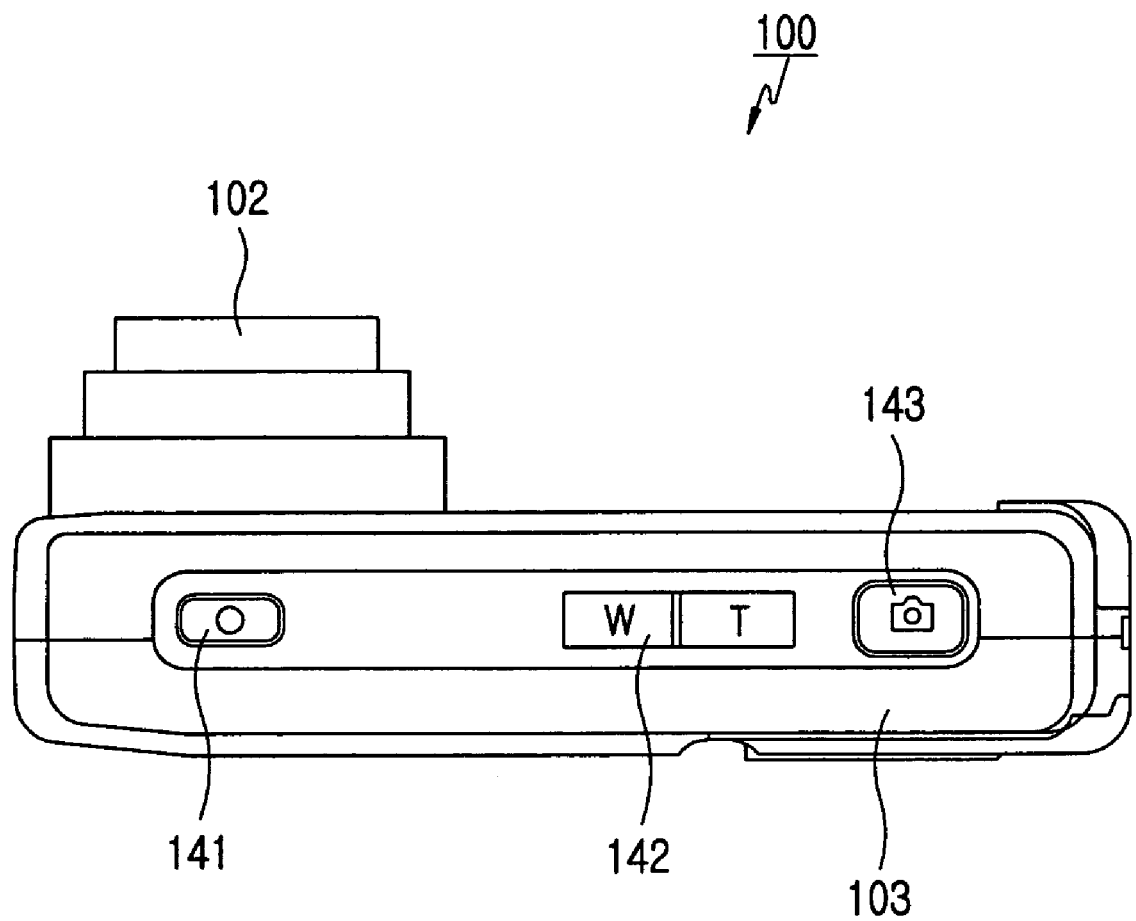
FIG. 2 is a side view illustrating a side surface of the mobile communication terminal according to an exemplary embodiment of the present invention.

FIG. 1 is a perspective view illustrating a mobile communication terminal according to an exemplary embodiment of the present invention. FIG. 2 is a side view illustrating a side surface of the mobile communication terminal according to the exemplary embodiment of the present invention.

Referring to FIGS. 1 and 2, in the mobile communication terminal, an optical zoom camera lens module 102 is disposed at a lower portion of the body, and camera operation keys, such as a camera power source key 141 used when entering the camera mode, zoom keys 142 used to regulate the zoom increments, in other words, magnifications of the camera lens module 102, and a shutter key 143 used to photograph an image are disposed on one surface of the body.

The camera lens module 102 is a zoom lens section in which zoom steps of the lens are regulated, and is moved upward and downward by the zoom key 142. In the zoom key 142, W is an abbreviation for WIDE and T is an abbreviation for TELE. If the mobile communication terminal 100 is converted to a camera mode by a request of a user, it is in a preview state, in other words, in a wide state which is zoom magnification step 0. If a user presses the "T" key, the zoom is operated and the image is magnified. Generally, the zoom steps are divided into preferably six or seven steps.

Figure 3:
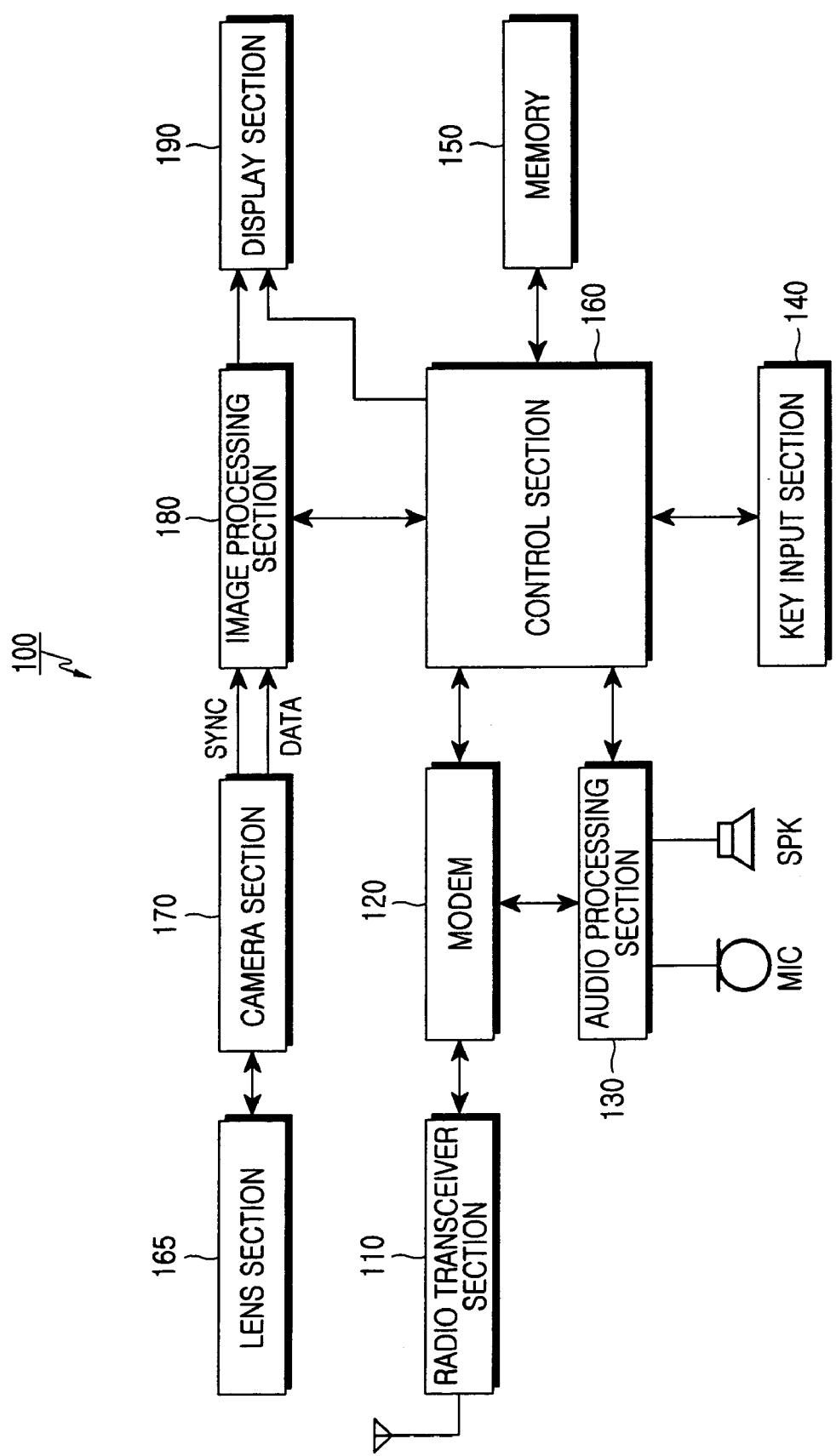
FIG. 3 is a block diagram illustrating a mobile communication terminal according to an exemplary embodiment of the present invention.

FIG. 3 is a block diagram illustrating the mobile communication terminal according to an exemplary embodiment of the present invention.

The mobile communication terminal 100 comprises a radio transceiver section 110, a modem 120, an audio processing section 130, a key input section 140, a memory 150, a control section 160, a lens section 165, a camera section 170, an image processing section 180, and a display section 190.

The radio transceiver section 110 is in charge of transmitting and receiving voice data, letter data, image data, and control data under the control of the control section 160 and comprises a radio frequency (RF) transmitter (not shown) for raising and amplifying frequencies of the transmitted signals and a RF receiver (not shown) for amplifying the received signals, so that the signals have low noises, and lowering the frequencies of the signals.

The modem 120 comprises a transmitter (not shown) for encoding and modulating the transmitted signals and a receiver (not shown) for decoding and demodulating the received signals.

The audio processing section 130 constitutes a codec. The codec comprises a data codec (not shown) for processing packet data and the like and an audio codec (not shown) for processing audio signals of voice and the like.

The audio processing section 130 modulates the electric signals input from a microphone and converts them to voice data, and demodulates the encoded voice data to electrical signals to output to a speaker. Further, in an exemplary implementation, it is preferable that the audio processing section 130 comprises a codec so that it converts the digital audio signals received by the radio transmitting and receiving section to analog signals to reproduce them or converts the analog audio signals to digital audio signals. The codec comprises a data codec for processing packet data and an audio codec for processing audio signals of voice. The codec may be included in the control section.

The key input section 140 has a key matrix structure (not shown), and comprises letter keys, number keys, function keys, and outer volume keys to output the key inputting signals corresponding to keys input by a user and to output the key inputting signals to the control section 160. The key input section 140 can comprise camera operation keys of FIG. 1, such as the camera power source key 141 used when entering the camera mode, the zoom keys 142 used to regulate the zoom steps, in other words, magnifications of the camera lens module 102, and the shutter key 143 used to photograph an image.

The memory 150 can comprise program memories and data memories, and stores the selected various information, based on the information required to control the operation of the mobile communication terminal 100 according to the exemplary embodiment of the present invention and on the user selecting information. Further, the memory 150 can store programs for controlling the lens section 165 comprising the camera lens module 102 in a camera mode, in other words, image photographing mode according to the exemplary embodiment of the present invention. Further, the memory 150 stores in the form of Table. 1 the information to which a zoom step for photographing an image of a subject in full size of the screen of the display section 190 according to a distance between the subject to be photographed and the camera corresponds.

TABLE 1

| | Zoom Step | | | | | | |
|---|---|---|---|---|---|---|---|
| | 1 | 2 | 3 | 4 | 5 | 6 | 7 |
| Distance | 0.3 m | 0.35 m | 0.42 m | 0.52 m | 0.63 m | 0.74 m | 0.87 m |

Referring to Table 1, the zoom steps are divided into preferably seven steps. The zoom step 1 corresponds to the distance between the camera and the subject of 0.3 m, the zoom step 2, 0.35 m, the zoom step 3, 0.42 m, the zoom step 4, 0.52 m, the zoom step 5, 0.63 m, the zoom step 6, 0.74 m, and the zoom step 7, 0.87 m.

In Table 1, if the step of the zoom is higher, the magnification of the zoom step is also higher and the image is magnified. If the subject is photographed in the magnification of the optimum camera zoom step according to the distance between the camera and the subject, the image of the subject can be photographed in the full size of the screen of the display section 190. In contrast, in the exemplary embodiment of the present invention, it should be noted that although the zoom steps are divided into seven steps, they are not restricted to the steps and may be modified according to the efficiency of the lens section 165.

The control section 160 controls the overall operations of the mobile communication terminal 100 according to the exemplary embodiment of the present invention. The control section 160 controls the memory so that the memory 150 stores the information to which a zoom step for photographing an image of a subject in full size of the screen of the display section 190 according to a distance between the subject to be photographed and the camera corresponds, in the form of Table. 1.

If there is a request of a user, the control section 160 converts the operation mode of the mobile communication terminal 100 to a mode for photographing a subject in full size of the screen of the display section 190. If the shutter key is input to photograph an image, the control section 160 detects the distance between the subject and the camera provided in the mobile communication terminal 100, reads the zoom step corresponding to the detected distance from the memory 150, and controls the operations of the mobile communication terminal 100 so that the image of the subject is photographed in the zoom step. Then, the control section 160 can control the display section 190 so that the display section 190 displays the zoom step read from the memory 150. Then, a user can recognize the zoom step.

The camera section 170 comprises a lens section 165 which can be withdrawn out and put in, and photographs image data through the lens section 165.

The camera section 170 comprises a camera sensor for converting the photographed optical signals to electrical signals and a signal processing section for converting the analogue image signals taken by the camera sensor to digital data.

Here, the camera sensor is assumed to be a Charge Coupled Device (CCD) sensor and the signal processing section is embodied with a Digital Signal Processor (DSP). Further, the camera sensor and the signal processing section can be embodied integrally or separately.

The image processing section 180 performs a function of generating screen data for displaying the image signals output in the camera section.

The image processing section 180 processes image signals output in the camera section 170 in a frame unit and outputs the frame image data in correspondence to the characteristics and the size of the display section 190. Further, the image processing section 180 comprises an image codec and performs a function of compressing the frame image data displayed in the display section or restoring the compressed frame image data to the original frame image data.

Further, the image processing section 180 is assumed to have an On Screen Display (OSD) function and can output the OSD data according to the screen size displayed under the control of the controlling section 160.

The display section 190 can comprise a Liquid Crystal Display (LCD) and outputs display data generated in the mobile communication terminal. Then, if the LCD is embodied in a touch screen method, the display section 190 can be operated as an inputting section.

The display section 190 displays the image signals output in the image processing section 180 on a screen and displays the user data output in the control section 160.

The display section 190 can display the zoom step which the control section 160 reads from the memory 150 according to an exemplary embodiment of the present invention.

Figure 4:
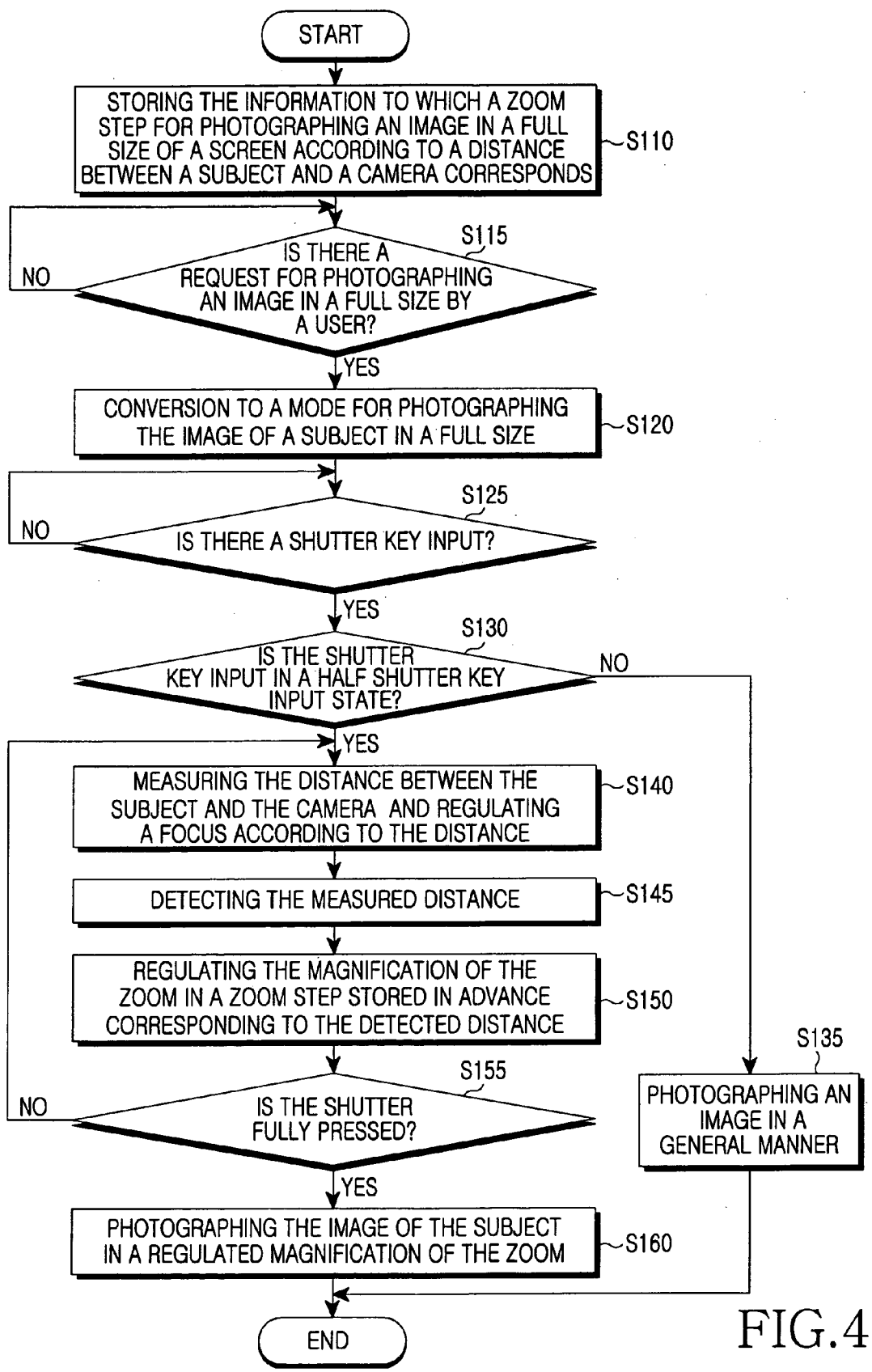
FIG. 4 is a flow chart illustrating processes of performing a camera function of the mobile communication terminal according to an exemplary embodiment of the present invention.

FIG. 4 is a flow chart illustrating a camera function of the mobile communication terminal according to the exemplary embodiment of the present invention Referring to FIGS. 3 and 4, the control section 160 stores in the memory 150 the information in which a zoom step for photographing an image of a subject in full size of the screen of the display section 190 according to a distance between the subject to be photographed and the camera, in other words, the lens section 165 corresponds to the distance at step S110. Then, the zoom step means the zoom step of the lens section 165 connected to the camera section 170. The information is preferably stored in the memory 150 in the form of Table. 1. The subject comprises a document of a predetermined size or a printed photograph or picture.

The control section 160 determines whether there is full size photographing request, such as a request through menu key input, of a user in an image photographing mode. The full size photographing request means a mode converting request for photographing an image of a subject in full size of the screen of the display section 190.

If there is the request of the user, the control section 160 converts the operation mode of the mobile communication terminal 100 to a mode for photographing the image of the subject in the full size of the screen of the display section 190.

The control section 160 determines whether there is a shutter key input for photographing an image at step S125. If there is the shutter key input, the control section 160 determines whether the input state is the half shutter input state in which the shutter key is pressed by half at step S130.

If the shutter key input is not in the half shutter input state but in the fully pressed input state, the image of the subject is photographed in a general manner at step S135.

In contrast, if the shutter key input is in the half shutter input state in the step S130, the control section 160 drives an auto-focusing motor mounted to the lens section 165 and regulates the focus according to the distance between the subject and the camera at step S140. Through the step S140, the distance between the subject and the camera can be measured. The method by which the distance between the subject and the camera to regulate the focus is well known in the art, the detailed description thereof is omitted for clarity and conciseness.

The control section 160 detects the measured distance at step S145, and regulates the magnification of the zoom in the zoom step stored in the memory 150, corresponding to the detected distance. Then, the control section 160 may display on the display section 190 so that a user may recognize the zoom step corresponding to the detected distance, or can output the zoom step in a voice through the audio processing section 120.

If the shutter key is completely pressed in the state in which the magnification of the zoom is regulated, such as in the half shutter input state, the controlling section 160 photographs the image of the subject in a regulated magnification of the zoom. Then, the size of the photographed image is full size of the screen of the display section 190.

On the other hand, when the shutter key input is in the half shutter input state, the time interval taken to the step in which the magnification of the zoom is automatically regulated to perform optimum photographing is about one second.

FIGS. 5a to 5d are exemplary views illustrating operations of the mobile communication terminal according to an exemplary embodiment of the present invention.

Figure 5B:
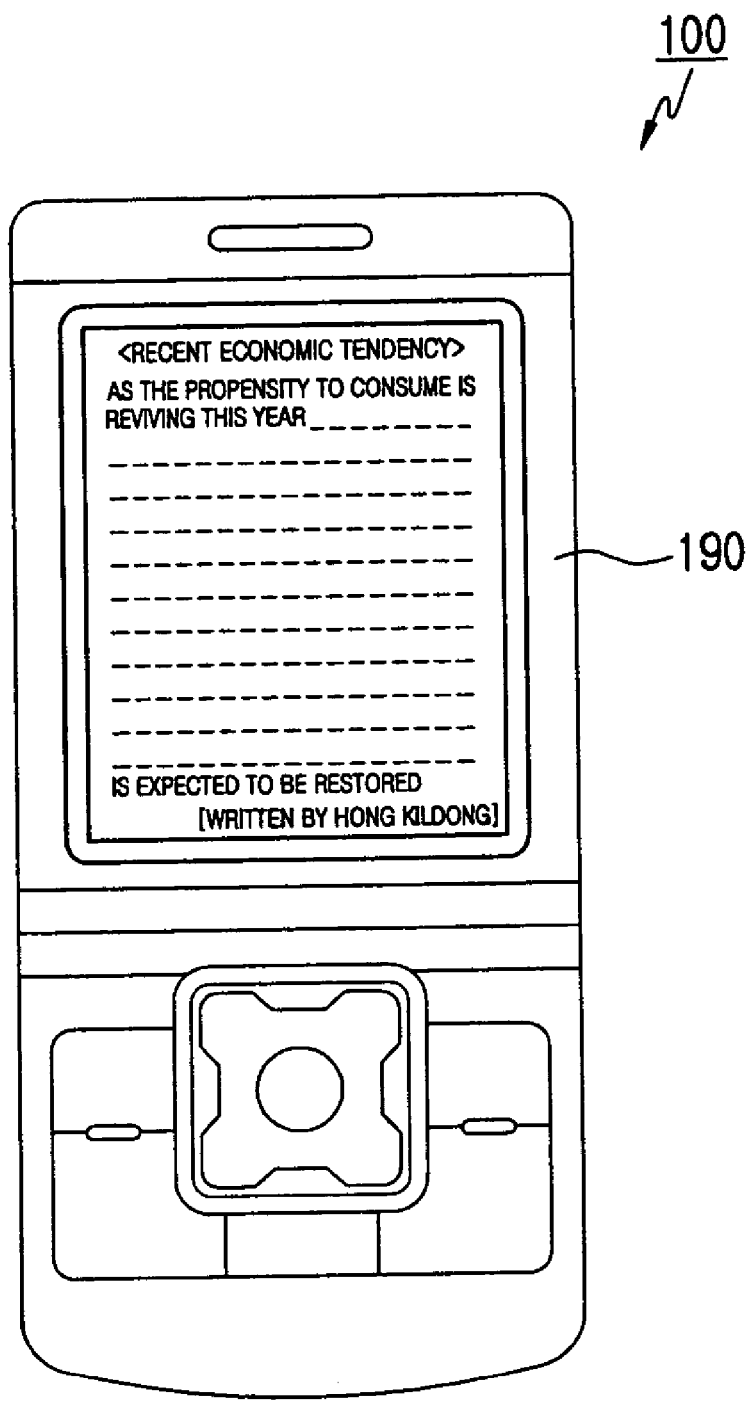

Referring to FIGS. 5a to 5d, FIG. 5a is an example of an A4 size document to be photographed by the mobile communication terminal 100. FIG. 5b is an example of a state in which the document 200 is photographed in full size of a screen of the display section 190 by automatically regulating the zoom magnification of the camera according to the distance between the document 200 and the mobile communication terminal 100.

Figure 5C:
Figure 5D:
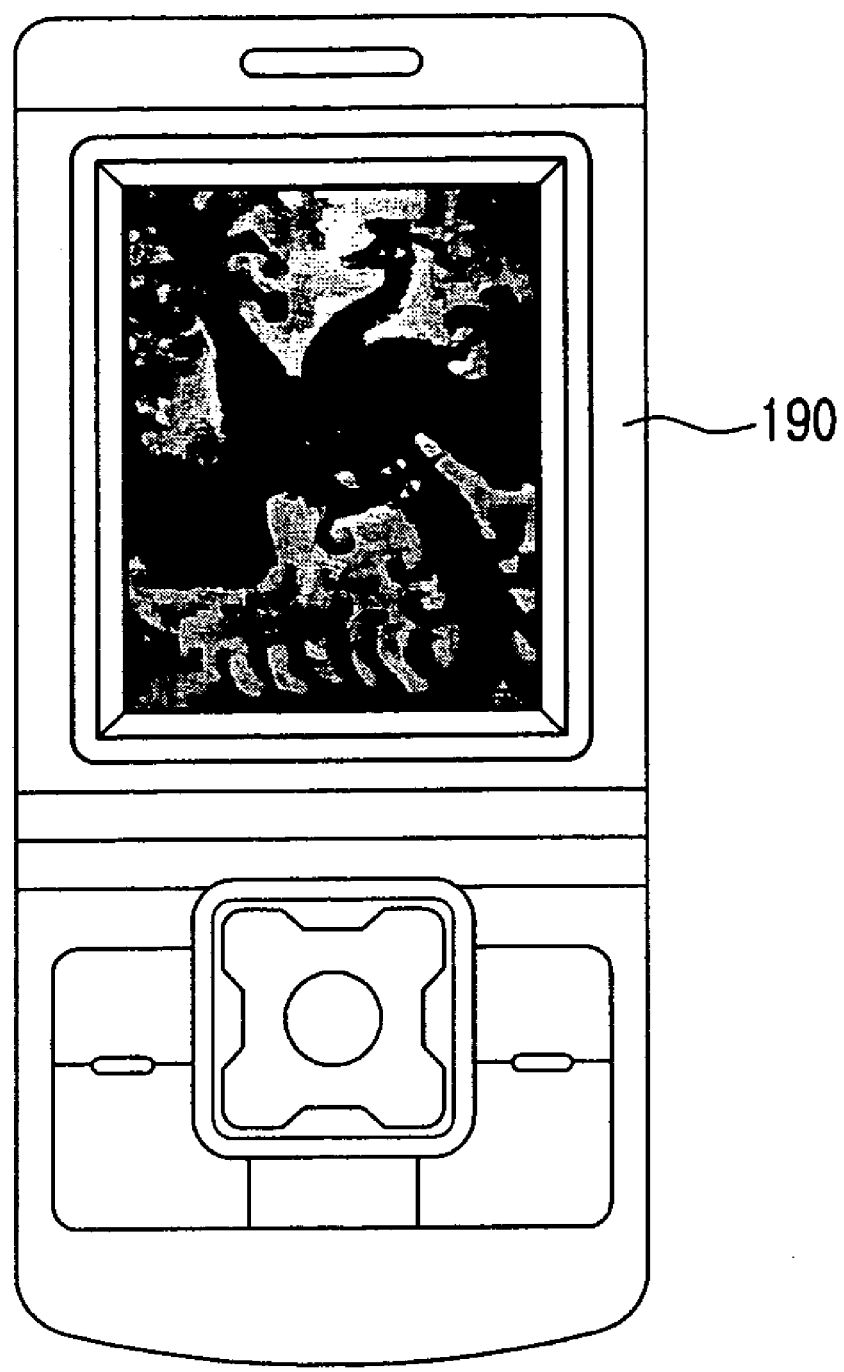

FIG. 5c is an example of a picture frame to be photographed by the mobile communication terminal 100. FIG. 5d is an example of a state in which the picture frame 300 is photographed in the full size of the screen of the display section 190 by automatically regulating the zoom magnification of the camera according to the distance between the picture frame 300 and the mobile communication terminal 100.

According to the exemplary embodiment of the present invention, since the optimum zoom step is automatically regulated according to a distance between the subject and the camera, the image of the subject can be photographed in the full size of the screen of the display section of the mobile communication terminal without the direct zoom regulation of a user.

While the invention has been shown and described with reference to certain exemplary embodiments thereof, it will be understood by those skilled in the art that various changes in form and details may be made therein without departing from the spirit and scope of the invention as defined by the appended claims. For example, although a mobile communication terminal having a camera is explained as detailed exemplary embodiments in the specification, it is apparent that exemplary embodiments of the present invention can be applied to a digital camera device. Therefore, the scope of the present invention should be determined not by the exemplary embodiment but by claims and the equivalents of the claims.

What is claimed is:

1. A method for performing a camera function, wherein, an image is magnified or reduced, the method comprising the steps of:
    detecting a distance between subject and a camera if a command for photographing an image of a subject in a mode for photographing the subject in full size of a screen of a display section is input;
    regulating a magnification of a zoom using a stored zoom step based on the detected distance;
    photographing the image of the subject in a regulated magnification of the zoom; and
    storing, in advance, information indicative of zoom steps for photographing the image of the subject in full size of a screen of a display section according to the distance between the subject and the camera.

2. A method according to claim 1, wherein the subject comprises at least one of:
    a document of a predetermined size, a printed photograph, and a picture.

3. A method according to claim 1, wherein, the detecting step comprises, if the command includes a shutter key input comprising a half shutter input in which the shutter key is pressed by half, then the distance between the subject and the camera is detected.

4. A method according to claim 3, wherein the detecting step comprises the steps of:
    converting an operation mode of a mobile communication terminal to a mode in which the image of the subject is photographed in the full size of the screen of the display section, based on a request of a user in an image photographing mode;
    measuring the distance between the subject and the camera in which the shutter key input is a half shutter input and regulating focus according to the distance; and
    detecting the measured distance to regulate the focus.

5. A method according to claim 1, wherein, the photographing step comprises, if the command includes a shutter being fully pressed in a half shutter input, photographing the image of the subject in the regulated magnification of the zoom.

6. A method according to claim 5, wherein the photographing step further comprises the step of:
    displaying the regulated magnification of the zoom on the screen of the display section.

7. A method for performing a camera function, whereas, an image is magnified or reduced, the method comprising the steps of:
    detecting a distance between a subject and camera if a command for photographing an image of the subject in a document photographing mode for photographing a document of a predetermined size in full size of a screen of a display section is input;
    regulating a magnification of a zoom using a stored zoom step based on the detected distance;
    photographing the document in a regulated magnification of the zoom; and storing, in advance, information indicative of zoom steps for photographing the document in full size of a screen of a display section according to the distance between the subject and the camera.

8. A method according to claim 7, wherein, the detecting step comprises, if the command includes a shutter key input comprising a half shutter input in which the shutter key is pressed by half, detecting the distance between the document and the camera.

9. A method according to claim 8, wherein the detecting step comprises the steps of:
    converting an operation mode of a mobile communication terminal to a document photographing mode, based on a request of a user in an image photographing mode;
    measuring the distance between the subject and the camera in the shutter key input is a half shutter input and regulating focus according to the distance; and
    detecting the measured distance to regulate the focus.

10. A method according to claim 7, wherein, the photographing step comprises, if the command includes a shutter being fully pressed in the half shutter input, photographing the document in the regulated magnification of the zoom.

11. A method according to claim 10, wherein the photographing step further comprises the step of:

displaying the stored zoom step indicative of the detected distance on the screen of the displaying section.

12. A mobile communication terminal comprising:

a camera section having a lens section, the lens section comprising at least one of extending and retracting capability, for photographing an image of the subject through the lens section;

a display section for displaying the photographed image of the subject;

a memory for storing information indicative of a zoom step for photographing an image of a subject in full size of the screen of the display section according to a distance between the subject to be photographed and the camera; and a control section for detecting the distance between the subject and the camera if a command for photographing an image is input in a mode for photographing the subject in full size of a screen of the display section, and for controlling the mobile communication terminal to photograph the image of the subject in a zoom step read from the memory and corresponding to the detected distance.

13. A mobile communication terminal according to claim 12, wherein the subject comprises at least one of:

a document of a predetermined size, a printed photograph, and a picture.

14. A mobile communication terminal according to claim 12, wherein the control section controls the mobile communication terminal to display the zoom step read from the memory on the display section.

15. A mobile communication terminal according to claim 12, wherein if the command comprises a shutter key input comprising a half shutter input in which the shutter key is pressed by half, the control section measures the distance between the subject and the camera to regulate focus and detects the distance.

16. A mobile communication terminal according to claim 15, wherein the control section regulates the lens section in the zoom step corresponding to the detected distance.

17. A mobile communication terminal according to claim 16, wherein, if the command comprises a shutter being fully pressed in the half shutter input, the control section controls the mobile communication terminal to photograph image of the subject in the zoom step corresponding to the detected distance.

* * * * *

UNITED STATES PATENT AND TRADEMARK OFFICE
CERTIFICATE OF CORRECTION

PATENT NO.      : 7,657,166 B2
APPLICATION NO. : 11/203221
DATED           : February 2, 2010
INVENTOR(S)     : Woo-Sun Yoon Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this

Twenty-eighth Day of December, 2010

David J. Kappos
*Director of the United States Patent and Trademark Office*